(12) United States Patent
Seok et al.

(10) Patent No.: US 8,971,225 B2
(45) Date of Patent: Mar. 3, 2015

(54) METHOD OF COMMUNICATION FOR STATION OPERATING BASED ON BATTERY IN WIRELESS LOCAL AREA NETWORK SYSTEM AND APPARATUS FOR THE SAME

(75) Inventors: Yong Ho Seok, Anyang-si (KR); Hyang Sun You, Anyang-si (KR); Eun Sun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 421 days.

(21) Appl. No.: 13/415,148

(22) Filed: Mar. 8, 2012

(65) Prior Publication Data

US 2012/0320755 A1 Dec. 20, 2012

Related U.S. Application Data

(60) Provisional application No. 61/497,937, filed on Jun. 16, 2011.

(51) Int. Cl.
*H04W 52/02* (2009.01)
*H04W 24/10* (2009.01)

(52) U.S. Cl.
CPC .......... *H04W 24/10* (2013.01); *H04W 52/0212* (2013.01); *H04W 52/0225* (2013.01); *H04W 52/0216* (2013.01)
USPC ........................................................ 370/311

(58) Field of Classification Search
None
See application file for complete search history.

(56) References Cited

U.S. PATENT DOCUMENTS

| 7,551,892 B1* | 6/2009 | Elliott | 455/41.1 |
| 2002/0090949 A1* | 7/2002 | Stanforth | 455/445 |
| 2006/0273896 A1* | 12/2006 | Kates | 340/539.18 |
| 2009/0073907 A1* | 3/2009 | Cai | 370/311 |
| 2009/0180414 A1* | 7/2009 | Maeda et al. | 370/311 |
| 2010/0318641 A1* | 12/2010 | Bullard et al. | 709/223 |
| 2012/0278490 A1* | 11/2012 | Sennett et al. | 709/227 |
| 2012/0320810 A1* | 12/2012 | Nourbakhsh | 370/311 |

* cited by examiner

*Primary Examiner* — Ayaz Sheikh
*Assistant Examiner* — Tarell Hampton
(74) *Attorney, Agent, or Firm* — Birch, Stewart, Kolasch & Birch, LLP

(57) ABSTRACT

A method of communication based on battery in a wireless LAN system is provided. The method includes receiving, by a station (STA), a battery lifetime request message from an access point (AP), wherein the battery lifetime request message includes a battery lifetime report interval field and battery lifetime report threshold field, the battery lifetime report interval field indicating an interval at which the STA report a battery lifetime, the battery lifetime report threshold field indicating a threshold of the battery lifetime and transmitting, by the STA, a first battery lifetime report message including information indicating a first battery lifetime.

12 Claims, 8 Drawing Sheets

METHOD OF COMMUNICATION FOR STATION OPERATING BASED ON BATTERY IN WIRELESS LOCAL AREA NETWORK SYSTEM AND APPARATUS FOR THE SAME

CROSS-REFERENCE TO RELATED APPLICATION

This application claims the benefit of priority of U.S. Provisional applications 61/497,937 filed on Jun. 16, 2011, which is incorporated by reference in their entirety herein.

BACKGROUND OF THE INVENTION

1. Field of the Invention

The present invention relates to a wireless local area network system, and more particularly, to a method of communication for station operating based on battery in a wireless local area network system and apparatus for the same.

2. Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

Wireless LAN systems support active mode and power save mode as an operation mode for stations STAs. In the active mode, STAs operate in an awake state to transmit and receive frames. A power save mode is supported for power saving of STAs which need not remain in the active state for frame reception. STAs which back up PSM operate in a doze mode to prevent unnecessary power consumption while the STAs cannot access the wireless medium. In other words, the STAs operate in the awake state only while the STAs can transmit or receive frames.

As WLAN systems are widespread, a single AP (Access Point) provides services to many non-AP STSs. Further, as the number of mobile-type non-AP STAs which support WLAN increases, methods are required that can support increased mobility.

An M2M (Machine to Machine) network is an example of an environment where multiple STAs are present in a single wireless LAN system. In the existing WLAN systems, a human approaches an AP through a non-AP STA to receive services. In the M2M network, however, a machine which supports WLAN communication plays a leading role to transmit and receive information.

In the existing WLAN systems, a non-AP STA used by a user requests information via an AP and receives information from the AP. In a general WLAN system, processes for link establishment, such as scanning, authentication, and association, are actively performed through a request from the non-AP STA. This is appropriate for a communication flow in which a user requests information through a non-AP STA and obtains requested information from an AP. In contrast, in an M2M-supported WLAN system, a user requests through an AP that a plurality of non-AP STAs associated with the AP send information and obtains information from each non-AP STA.

As such, introduction of M2M-supported WLAN systems and increased mobility of STAs may be incorporated with battery-based operation. Accordingly, power management of STAs becomes more crucial. Thus, there is a need for a communication method for battery-based STAs and a device of supporting the method, which can effectively apply to the wireless LAN environment.

SUMMARY OF THE INVENTION

The present invention provides a method of communication for station operating based on battery in a wireless local area network system and apparatus for the same.

In an aspect, a method of communication based on battery in a wireless LAN system is provided. The method includes receiving, by a station (STA), a battery lifetime request message from an access point (AP), wherein the battery lifetime request message includes a battery lifetime report interval field and battery lifetime report threshold field, the battery lifetime report interval field indicating an interval at which the STA report a battery lifetime, the battery lifetime report threshold field indicating a threshold of the battery lifetime and transmitting, by the STA, a first battery lifetime report message including information indicating a first battery lifetime.

The first battery lifetime report message may be transmitted when a frame transmission interval passes after the battery lifetime request message has been received, if the battery lifetime request message indicates immediate battery lifetime report.

The first battery lifetime report message may be transmitted when the interval indicated by the battery lifetime report interval field passes after the battery lifetime request message has been received, if the battery lifetime request message does not indicate the immediate battery lifetime report.

The method further includes receiving, by the STA, a battery lifetime extension management message from the AP. The battery lifetime extension management message includes a duty cycle field indicating a duty cycle and a transmission power limit field indicating a transmission power limit value.

The method further includes operating, by the STA, based on the duty cycle and the transmission power limit value.

The battery lifetime extension management message may further include a power off duration field indicating duration during which the STA operates in a power-off state, the method may further include switching, by the STA, to the power-off state and operating, by the STA, in the power-off state during the duration indicated by the power off duration field.

The method may further include transmitting, by the STA, a second battery lifetime report message to the AP when the interval indicated by the batter lifetime report interval field passes after the first battery lifetime report message has been transmitted. The second battery lifetime report message may include information indicating a second battery lifetime.

The information indicating the second battery lifetime may be configured to indicate that the switch to a main power-based operation mode gas been made, if the STA switches from a battery-based operation mode to the main power based operation mode.

The method may further include transmitting, by the STA, a switch message to the AP, the switch message indicating that the switch to a main power-based operation mode has been made, if the STA switches from a battery-based operation mode to the main power-based operation mode.

The method may further include transmitting, by the STA, an extended capabilities information element to the AP. The extended capabilities information element may include a battery lifetime report field indicating whether the STA supports the battery lifetime report; and a battery-based operating device field indicating whether the STA is operated based on a battery.

The extended capabilities information element may be transmitted in an association request message that requests that the STA be associated with the AP.

The extended capabilities information element may be transmitted in a probe request frame, the probe request frame being transmitted for scanning an AP with which the STA exchange frames.

In another aspect a wireless apparatus is provided. The wireless apparatus includes a battery configured to supply power, a transceiver configured to transmit and receive radio signals and a processor operatively coupled with the transceiver. The processor is configured for receiving a battery lifetime request message from an access point (AP), wherein the battery lifetime request message includes a battery lifetime report interval field and battery lifetime report threshold field, the battery lifetime report interval field indicating an interval at which the STA report a battery lifetime, the battery lifetime report threshold field indicating a threshold of the battery lifetime and transmitting a first battery lifetime report message including information indicating a first battery lifetime.

DESCRIPTION OF THE EMBODIMENTS

Figure 1:
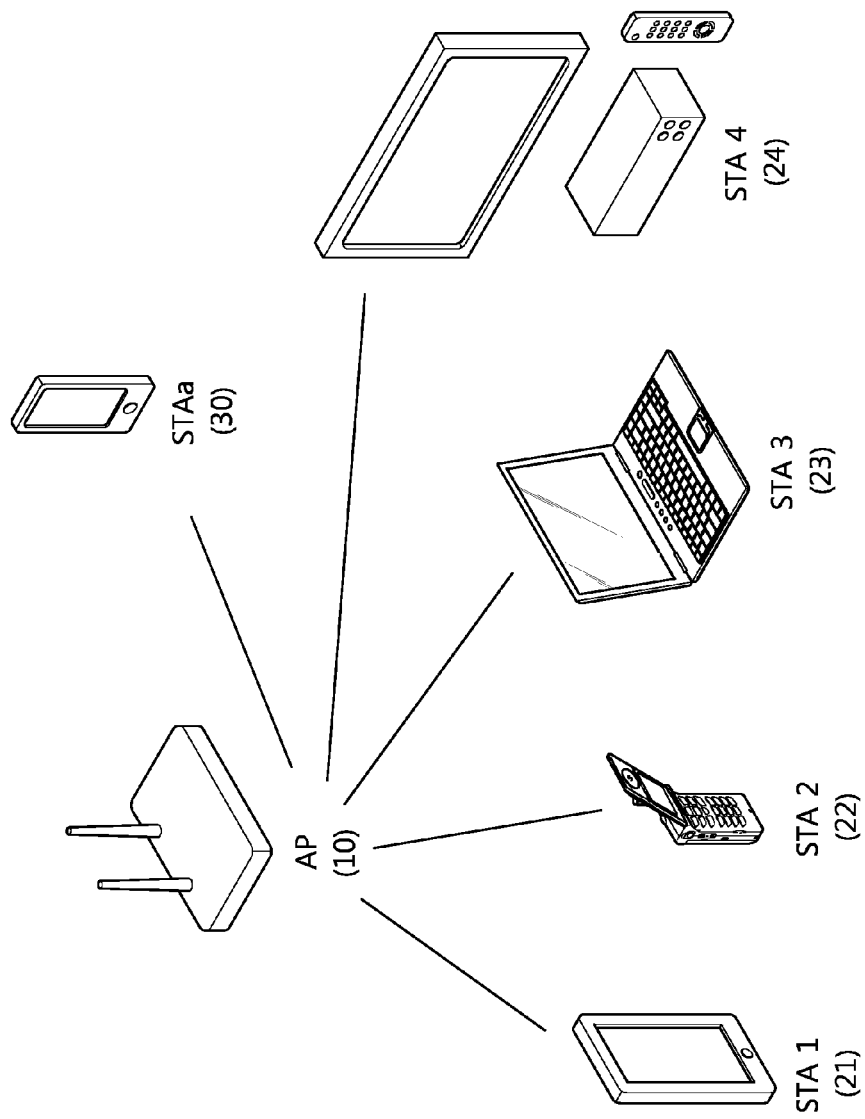
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

In wireless communication systems, it is difficult to realize whether there is any network when an STA powers on/off due to characteristics of wireless media. Accordingly, no matter what type of STA is used, it needs to perform a process of "network discovery" in order to access a network. Discovering networks through the process, the STA selects a network for enrollment through a network selection process. Thereafter, the STA enrolls in the selected network and performs data exchange operation at transmission/reception ends.

In the wireless LAN system, the network discovery process is implemented as a scanning procedure. The scanning procedure includes passive scanning and active scanning. The passive scanning is conducted based on a beacon frame that is periodically broadcasted by an AP. In general, an AP in a wireless LAN broadcasts a beacon frame every a specific interval (e.g., every 100 msec). The beacon frame includes information on BSS managed by it. The STA stands by for reception of the beacon frame on a specific channel. Obtaining information on the network by receiving the beacon frame, the STA terminates the scanning procedure on the specific channel. The passive scanning is done only upon reception of the beacon frame without the need for the STA to transmit a separate frame, thereby reducing the overall overhead. However, the time for performing the scanning increases in proportion to the transmission cycle of the beacon frame.

Under the active scanning process, the STA actively broadcasts a probe request frame on a specific channel to request network information from all APs receiving the probe request frame. Receiving the probe request frame, an AP stands by for a random time to prevent frame collision, includes network information in a probe response frame, then transmits the probe response frame to the STA. Receiving the probe response frame, the STA obtains the network information and ends the scanning procedure. The active scanning can be finished relatively quickly but suffers from the increase of the entire network overhead due to the need of a frame sequence for request and response.

Finishing the scanning procedure, the STA selects a network according to its own specific criterion, then performs authentication with the AP. The authentication process is carried out in a 2-way handshake manner. After the authentication process, the STA initiates an association procedure with the AP.

The association procedure is done in a 2-way handshake manner. First, the STA transmits an association request frame to the AP. The association request frame includes information on capabilities of the STA. Based on the information, the AP determines whether to permit association with the STA. After the determination, the AP transfers an association response frame to the STA. The association response frame includes information indicating whether to permit association and information on indicating reasons for permission or failure of the association. The association response frame also includes information on capabilities supportable by the AR When the association is successfully complete, the AP and the STA normally performs frame exchange. When the association fails, another association procedure is performed or the STA makes an association request to another AP based on the information on reasons of failure of association which is included in the association response frame.

In order to address limited communication speed which has been regarded as weakness of wireless LAN systems, IEEE 802.11n has been recently established. IEEE 802.11n aims to increase network speed and reliability and expand operation distance of a wireless network. More specifically, IEEE 802.11n is based on MIMO (Multiple Inputs and Multiple Outputs) technologies to support high throughput (HT) of up to 540 Mbps. The MIMO technologies use multiple antennas for both transmitting and receiving units so as to minimize transmission errors and to optimize data rates.

As WLAN systems are widely used and various applications show up, new WLAN systems are demanded that can support higher throughput than that supported by IEEE 802.11n. Next-generation IEEE 802.11 WLAN systems have been suggested as a next version of IEEE 802.11n WLAN systems, which can support very high throughput (VHT) that reaches more than 1 Gbps at an MAC service access point (SAP).

The next-generation WLAN systems back up MU-MIMO (Multi User Multiple Input Multiple Output) transmission that enables multiple STAs to access a wireless channel at the same time in order to effectively utilize the wireless channel. According to the MU-MIMO transmission scheme, an AP can simultaneously transmit packets to one or more MIMO-paired STAs.

TV WS (White Space) refers to a frequency band that remains unused as analog TV broadcast evolves into digital in the U.S., and which occupies a range between 54 to 698 MHz. However, this is merely an example, and TV WS may be a band authorized for a licensed user to have priority for use. The licensed user means any user authorized to use a permitted band, and may be also referred to as 'licensed device', 'primary user', or 'incumbent user'.

APs and/or STAs which operate on the TV WS band need to provide protection functions for licensed users because the licensed users have priority in using the TV WS band. For instance, in the case that a licensed user, such as a microphone, has been already using a specific WS channel having a specified bandwidth divided from the TV WS band, the APs and/or STAs cannot use the frequency band corresponding to the WS channel to protect the licensed user. Also, when the licensed user uses a frequency band for transmission and/or reception of a current frame, the APs and/or STAs should stop using the frequency band.

Accordingly, the APs and/or STAs first perform a process to figure out whether a specified frequency band in the TV WS band can be used—i.e., whether there is any licensed user for the frequency band. Such process is referred to as 'spectrum sensing.' As mechanisms for spectrum sensing, energy detection or signature detection are used. When the strength of a received signal is not less than a predetermined value or when a DTV preamble is detected, it is determined that the frequency band is used by a licensed user.

When channel sensing is performed all the time for purpose of frame transmission/reception, the STA may continue power consumption. Since power consumption does not exhibit a big difference in the receiving state compared to when the STA is in the transmitting state, the lasting receiving state causes the battery-based STA to consume relatively much power. Accordingly, it leads to inefficient power consumption without any rise of WLAN throughput that the STA performs channel sensing while remaining in the reception standby state in the wireless LAN system. This result is inappropriate in light of power management.

To address the above issues, the WLAN system supports a power management (PM) mode for STAs. The PM mode includes an active mode and a power save (PS) mode. Each STA basically operates in the active mode. When operating in the active mode, the STA remains in the awake state. In other words, the STA maintains a state of being able to perform normal operation, such as frame transmission/reception or channel sensing.

When operating in the PS mode, the STA switches between the doze state and the awake state. In the doze state, the STA operates with the minimum power and does not receive any wireless signals including data frames from the AP. Or the STA does not perform channel sensing in the doze state.

Since power consumption reduces as the STA operates as long as possible in the doze state, the STA has an increased operating period. However, frame transmission/reception cannot be done in the doze state, so that the STA cannot unconditionally operate long. In the case that the STA has any frame to be sent to the AP in the doze state, the STA may switch to the awake state to transmit the frame. When the AP has any frame to be sent to the STA operating in the doze state, the STA cannot receive the frame nor can it recognize whether there are frames to receive. Accordingly, the STA may need to be aware of whether there is any frame to be sent to the STA, and if any, may need to be shifted to the awake state at a specific cycle. In response, the AP may transmit the frame to the STA. This will be described in detail with reference to FIG. 2.

Figure 2:
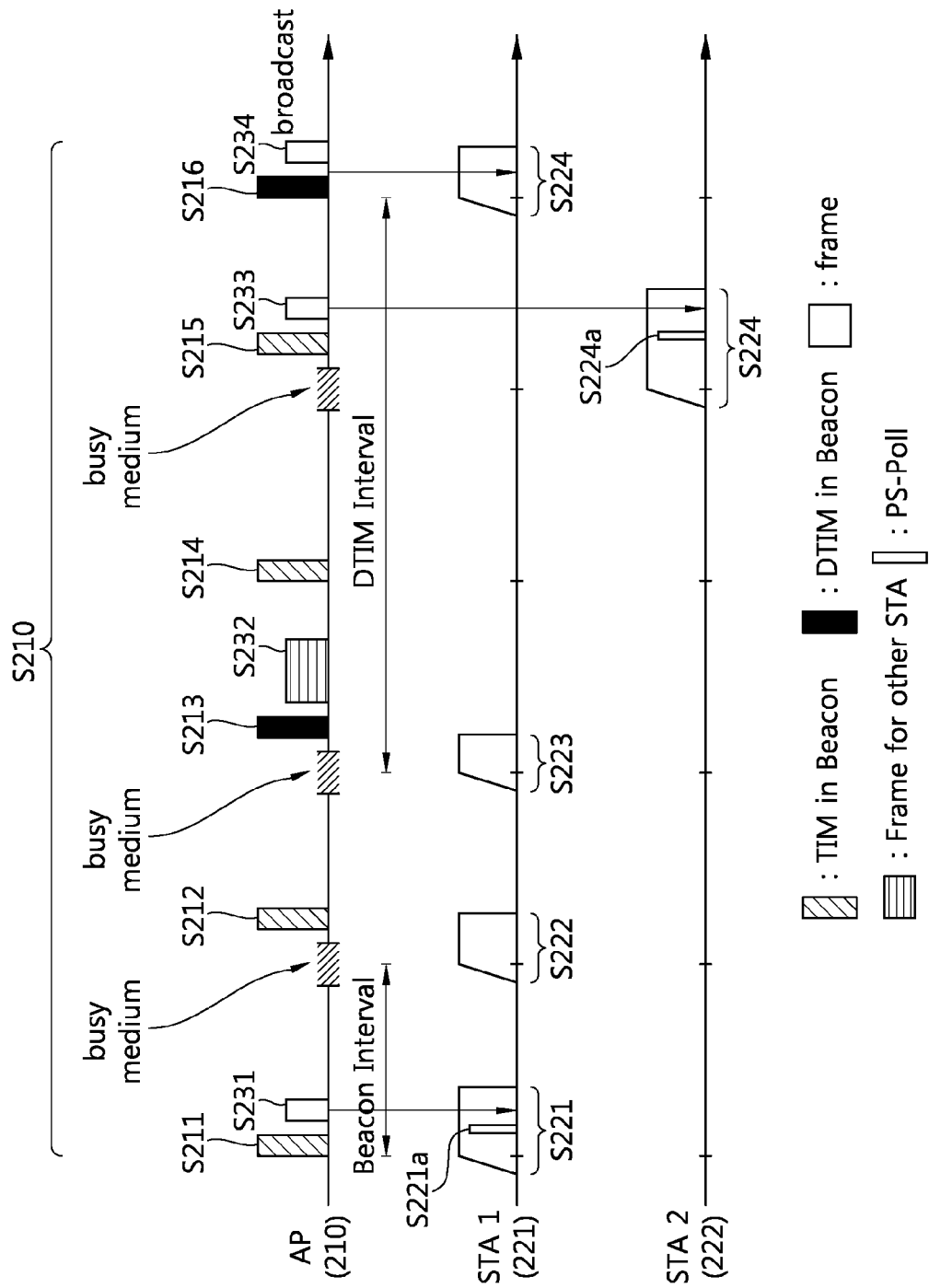
FIG. 2 shows an example of a power management operation.

FIG. 2 shows an example of a power management operation.

Referring to FIG. 2, an AP 210 transmits a beacon frame to STAs in a BSS in accordance with a specific period (step S210). The beacon frame includes a traffic indication map (TIM) information element. The TIM element includes information for reporting that the AP 210 has buffered traffic for which the STAs associated with and a frame will be transmitted. Examples of the TIM element include a TIM used to report a unicast frame and a delivery traffic indication map (DTIM) used to report a multicast or broadcast frame.

The AP 210 transmits the DTIM one time whenever a beacon frame is transmitted three times.

An STA1 221 and an STA2 222 are STAs operating in a PS mode. The STA1 221 and the STA2 222 can be configured such that they can transition from a doze state to an awake state in every wakeup interval of a specific period to receive the TIM element transmitted by the AP 210.

A specific wakeup interval can be configured such that the STA1 221 transitions to the awake state in every beacon interval to receive the TIM element. Therefore, the STA1 221 transitions to the awake state (step S221) when the AP 210 transmits a first beacon frame (step S211). The STA1 221 receives the beacon frame and acquires the TIM element. If the acquired TIM element indicates that there is a frame to be transmitted to the STA1 221, then the STA1 221 transmits to the AP 210 a PS poll frame that requests the AP 210 to transmit a frame (step S221a). The AP 210 transmits the frame to the STA1 221 in response to the PS poll frame (step S231). Upon completion of frame reception, the STA1 221 operates by transitioning back to the doze state.

When the AP 210 transmits a second beacon frame, a medium is busy, that is, another device accesses to the medium for example. Thus, the AP 210 may not be able to transmit the beacon frame in accordance with a correct beacon interval but may transmit it at a delayed time point (step S212). In this case, the STA1 221 switches its mode to the wake state in accordance with the beacon interval, but cannot receive the beacon frame transmitted with delay, and thus transitions back to the doze state (step S222).

When the AP 210 transmits a third beacon frame, the beacon frame may include a TIM element which is configured as a DTIM. However, since the medium is busy, the AP 210 transmits the beacon frame with delay (step S213). The STA1 221 operates by transitioning to the awake state in accordance with the beacon interval, and can acquire the DTIM by using the beacon frame transmitted by the AP 210. The DTIM acquired by the STA1 221 indicates that there is no frame to be transmitted to the STA1 221 and there is a frame for another STA. Therefore, the STA1 221 operates by transitioning back to the doze state. After transmitting the beacon frame, the AP 210 transmits the frame to a corresponding STA (step S232).

The AP 210 transmits a fourth beacon frame (step S214). However, since the STA1 221 cannot acquire information indicating that there is buffered traffic for the STA1 221 by receiving the TIM element two times, the STA1 221 may regulate a wakeup interval for receiving the TIM element. Alternatively, if signaling information for regulating a wakeup interval value of the STA1 221 is included in the beacon frame transmitted by the AP 210, the wakeup interval value of the STA1 221 may be regulated. Instead of transitioning an operation state for every beacon interval to receive the TIM element, the STA1 221 can be configured in the present embodiment such that the operation state is transitioned one time for every three beacon intervals. Therefore, the STA1 221 cannot acquire a corresponding TIM element since the AP 210 transmits the fourth beacon frame (step S214), and maintains the doze state when a fifth beacon frame is transmitted (step S215).

When the AP 210 transmits a sixth beacon frame (step S216), the STA1 221 operates by transitioning to the awake state, and acquires the TIM element included in the beacon frame (step S224). The TIM element is a DTIM that indicates existence of a broadcast frame, and thus the STA1 221 receives the broadcast frame transmitted by the AP 210 (step S234) instead of transmitting a PS poll frame to the AP 210.

Meanwhile, the wakeup interval assigned to the STA2 222 may have a longer period than that of the STA1 221. Therefore, the STA2 222 can receive the TIM element by transitioning to the awake state (step S225) when the fifth beacon frame is transmitted (step S215). The STA2 222 knows existence of a frame to be transmitted to the STA2 222 by using the TIM element, and transmits a PS poll frame to the AP 210 to request transmission (step S225a). The AP 210 transmits a frame to the STA2 222 in response to the PS poll frame (step S233).

In order to operate the PS mode of FIG. 2, the TIM element includes a TIM that indicates whether there is a frame to be transmitted to the STA or a DTIM that indicates whether there is a broadcast/multicast frame. The DTIM may be implemented by configuring a field of the TIM element.

When receiving a PS poll frame, the AP immediately transmits a frame, then sends a response, which is referred to as 'immediate response', or the AP first transmits an acknowledgement frame (shortly 'Ack frame'), prepares for a frame, and then transmits the frame, which is referred to as 'deferred response.'

As various communication services recently emerge, such as smart grid, e-Health, ubiquitous services, etc., M2M (Machine to Machine) technologies for supporting the services come into the spotlight. An M2M system may include sensors of sensing temperature or moisture, cameras, TVs or other home appliances, factory processing machines, or vehicles or similar large machines. The components constituting an M2M system may perform data communications based on WLAN communication. An M2M system, which supports WLAN and establishes a network, is hereinafter referred to as an "M2M WLAN system."

An M2M-supportive WLAN system includes the following characteristics:

1) Many STAs

Contrary to existing networks, an M2M system assumes that a number of STAs are disposed in a BSS. This is why not only devices owned by an individual but also sensors installed in homes or companies are considered. Accordingly, a great number of STAs may be connected to a single AP.

2) Low Traffic Load Per STA Since an M2M terminal has a traffic pattern of collecting and reporting peripheral information, it need not send information often. The amount of information is relatively small.

3) Uplink-Centered Communication

An M2M system mainly receives commands on a downlink, takes action, then reports resultant data on an uplink. Since main data is generally transmitted on the uplink, an M2M-supportive system focuses more on the uplink.

4) Power Management of STA

An M2M terminal is primarily powered from a battery. It is difficult for a user to often charge the battery. Accordingly, a power management scheme is required to minimize power consumption.

5) Automatic Restoration

The components constituting an M2M system are sometimes difficult for a human to manipulate on his own under a specific circumstance. Thus, it needs a self-restoration function.

As is often case, the stations in an M2M-supportive WLAN system are battery-based radio devices. Accordingly, the STA needs a method of enabling efficient frame transmission/reception as well as lower power consumption in order to prolong its battery lifetime.

According to an embodiment of the present invention, there is provided a method of enabling battery-based STAs to report their remaining battery life to an AP so that power control, such as control of duty cycle and Tx power limit, is performed based on the reported information, thereby supporting power management for the STAs. For this purpose, operating information parameters need to be defined that can be exchangeable between the AP and the STAs.

Hereinafter, it is assumed that STAs can calculate or estimate their expected battery life in describing a method of communication according to an embodiment of the present invention with reference to the accompanying drawings.

Figure 3:
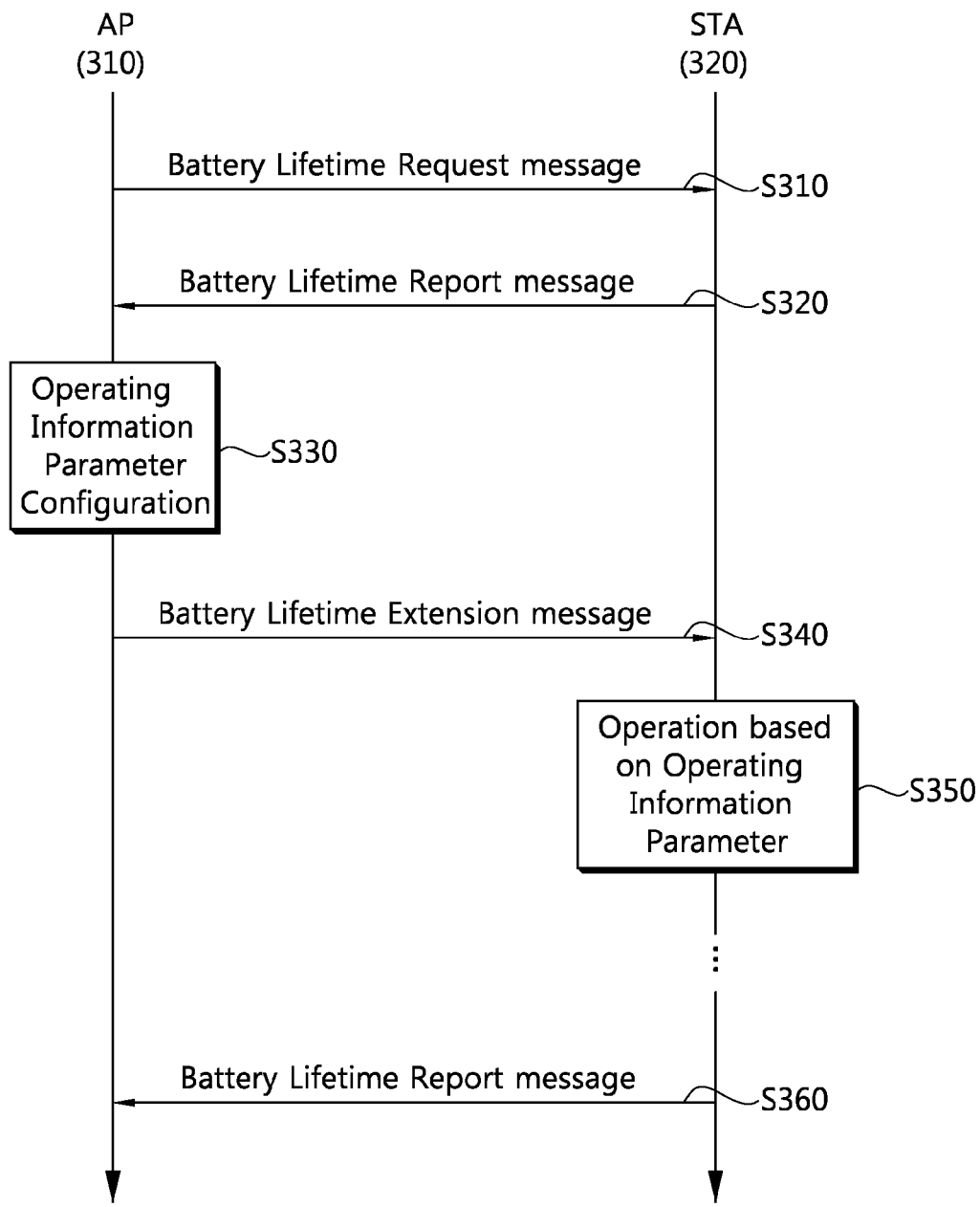
FIG. 3 is a view illustrating an example of a communication method according to an embodiment of the present invention.

FIG. 3 is a view illustrating an example of a communication method according to an embodiment of the present invention.

Referring to FIG. 3, an AP 310 transmits a battery lifetime request message to an STA 320 to request report of battery life (S310). The transmission of the battery lifetime request message may be implemented as transmission of a battery lifetime request frame.

Figure 4:
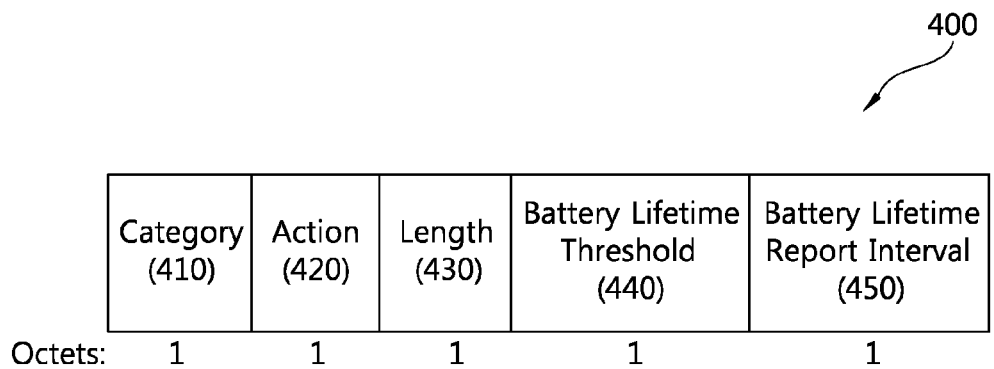
FIG. 4 illustrates a format of a battery lifetime request frame according to an embodiment of the present invention.

FIG. 4 illustrates a format of a battery lifetime request frame according to an embodiment of the present invention.

Referring to FIG. 4, the battery lifetime request frame 400 includes a category field 410, an action field 420, a length field 430, a battery lifetime threshold field 440, and a battery lifetime report interval field 450.

The category field 410 and the action field 420 may be configured to indicate that the frame is a battery lifetime request frame 400.

The length field 430 may be configured to indicate the length of the battery lifetime request frame 400.

The battery lifetime threshold field 440 may be configured to indicate a threshold of battery life which serves as a reference value on when the STA 320 reports battery lifetime. When its battery lifetime is equal to or shorter than the valued indicated by the battery lifetime threshold field 440, the STA 320 may report the battery lifetime to the AP 310.

The battery lifetime threshold field 440 may be set to have a specific value. When obtaining the value in the battery lifetime threshold field 440, the STA 320 may immediately report the battery lifetime to the AP 310. For instance, when the AP 310 sets the value of the battery lifetime threshold field 440 as 255, the STA 320 may report the battery lifetime to the AP 310.

According to an embodiment, the frame 400 may further a field indicating that the STA 320 should immediately report the battery lifetime to the AP 310. When receiving such field indicating immediate report, the STA 320 may promptly report the battery lifetime to the AP 310.

The battery lifetime report interval field 450 may be configured to indicate an interval at which the STA 320 reports the battery lifetime. For instance, when the battery lifetime report interval field 450 is set to indicate ten minutes, the STA 320 may report its battery lifetime to the AP 310 every ten minutes.

Referring back to FIG. 3, the STA 320 receives the battery lifetime request message, and in response, transmits a battery lifetime report message to the AP 310 (S320). When the battery lifetime report interval passes after the reception of the battery lifetime request message, the STA 320 may transmit the battery lifetime report message. In the case that the battery lifetime request message indicates the immediate report of battery lifetime, the STA 320 may transmit the battery lifetime report message to the AP right as soon as it receives the battery lifetime request message. Immediately transmitting the battery lifetime report message may be performed when a frame transmission interval, such as SIFS (Short Interframe Space), passes after the battery lifetime request message has been received. Transmission of the battery lifetime report message may be implemented as transmission of a battery lifetime report frame.

Figure 5:
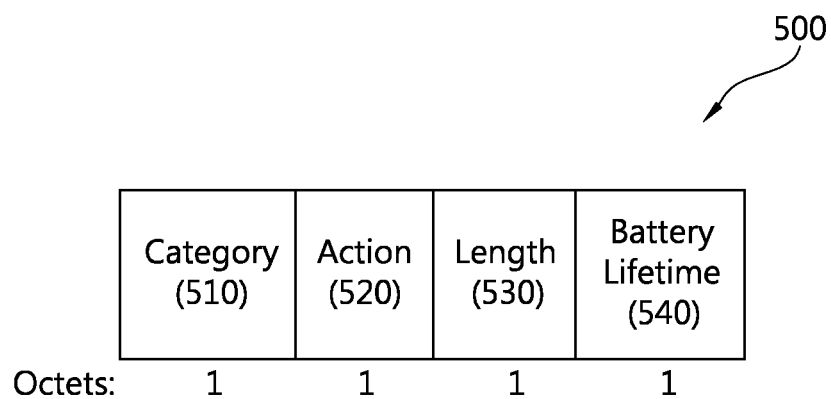
FIG. 5 illustrates a format of a battery lifetime report frame 500 according to an embodiment of the present invention.

FIG. 5 illustrates a format of a battery lifetime report frame 500 according to an embodiment of the present invention.

The battery lifetime report frame 500 includes a category field 510, an action field 520, a length field 530, and a battery lifetime field 540.

The category field 510 and the action field 520 may be configured to indicate that the frame is a battery lifetime report frame 500.

The length field 530 may be configured to indicate the length of the battery lifetime report frame 500.

The battery lifetime field 540 may be configured to indicate the remaining battery time of the STA 320. The remaining battery time may be an expected battery lifetime.

Figure 6:
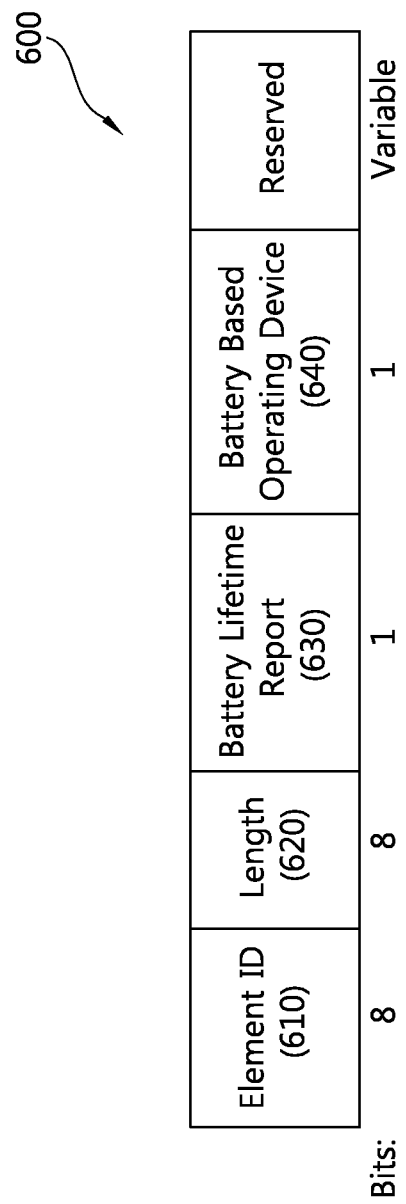
FIG. 6 illustrates a format of an extended capabilities information element according to an embodiment of the present invention.

To request that the STA 320 reports its battery lifetime to the AP 310, the AP 310 needs to be aware of whether the STA 320 supports a battery lifetime report protocol and whether the STA 320 is a battery-based radio device. For this purpose, necessary information may be exchanged while the STA 320 performs scanning or during the course of association/re-association between the AP 310 and the STA 320. Information necessary to support the battery lifetime report protocol may be included in an extended capabilities information element as illustrated in FIG. 6. The extended capabilities information element may be included in a probe request frame (during a scanning process) as transmitted from the STA 320 or included in an association request frame and/or re-association request frame (during an association/re-association process) as transmitted from the STA 320.

FIG. 6 illustrates a format of an extended capabilities information element according to an embodiment of the present invention.

Referring to FIG. 6, the extended capabilities information element 600 includes an element ID field 610, a length field 620, a battery lifetime report field 630, and a battery-based operating device field 640.

The element ID field 610 may be configured to indicate that the information element is an extended capabilities information element 600 including information for supporting a battery report protocol.

The length field 620 may be configured to indicate the length of the extended capabilities information element 600.

The battery lifetime report field 630 may be configured to indicate whether to support a battery lifetime report protocol. The battery lifetime report field 630 may be a bit field. In the case that the STA 320 may report the remaining battery lifetime—that is, when the STA 320 may transmit the battery lifetime report frame to the AP, the field 630 may be set as "1", and otherwise as "0". These specific values are merely examples.

The battery-based operating device field 640 may be configured to indicate whether the STA 320 is a battery-based radio device. The field 640 may be a bit field. For example, when the STA 320 is a battery-based radio device, the field 640 may be set as "1", otherwise as "0". The specific values are merely examples.

According to an embodiment, the battery-based STA may be switched to be powered by a main power source. Under this circumstance, the STA need not report the battery lifetime to AP any longer, but the STA needs to notify the AP that the STA has been changed to be powered from the main power source.

In the case that the STA switches its operation mode from the battery-based mode to the main power source mode before being associated with the AP or before the scanning process, the STA may report this to the AP by setting the field 640 of the extended capabilities information element. For example, in the case of not transferring information associated with battery-based operation to the AP 310, the STA 320 may notify the switch of the operation mode to the AP 310 through the scanning or association/re-association process.

In the case that the information associated with the battery-based operation has been already transferred from the STA 320 so that the operation is performed based on the battery lifetime report protocol, the STA 320 may transmit an operation mode switch report message to the AP. The transmission of the operation mode switch report message may be implemented as transmission of a battery lifetime report frame including information indicating a switch of the operation mode. The operation mode switch report may be implemented by setting the battery lifetime field 530 of the battery lifetime report frame 500 to have a specific value indicating that the battery lifetime is infinite. In this case, the STA may report the switch of operation mode to the AP at every battery lifetime report interval or upon responding to the battery lifetime request message.

The STA may require a method of being able to report the shift of operation mode to the AP simultaneously with the switch of the operation mode. For this purpose, a new frame may be defined that indicates the switch of the operation mode. Since the battery lifetime report frame 500 is transmitted when the battery lifetime is not more than the battery lifetime threshold or when the battery power runs short, or at every battery lifetime report interval, the frame may have a limitation in use for notification of the switch of operation mode. For prompt report of the operation mode switch, a new frame may be defined that indicates the switch of operation mode. The newly defined frame may include a specific field that indicates a battery-based operation mode when set as a predetermined value or indicates a main power source operation mode otherwise.

Referring back to FIG. 3, receiving the battery lifetime report message, the AP 310 sets operating information parameters to keep the battery lifetime the maximum and to optimize the battery use efficiency (S330). When the battery lifetime of the STA 320 is equal to or lower than a reference value, the AP 310 reduces the duty cycle of the STA 320 or restricts the transmission power of the STA 320.

The AP 310 transmits a battery lifetime extension message to the STA 320 (S340). The battery lifetime extension message may include the operation mode parameters set by the AP 310. The transmission of the battery lifetime extension message may be implemented by transmitting a battery lifetime extension management frame.

Figure 7:
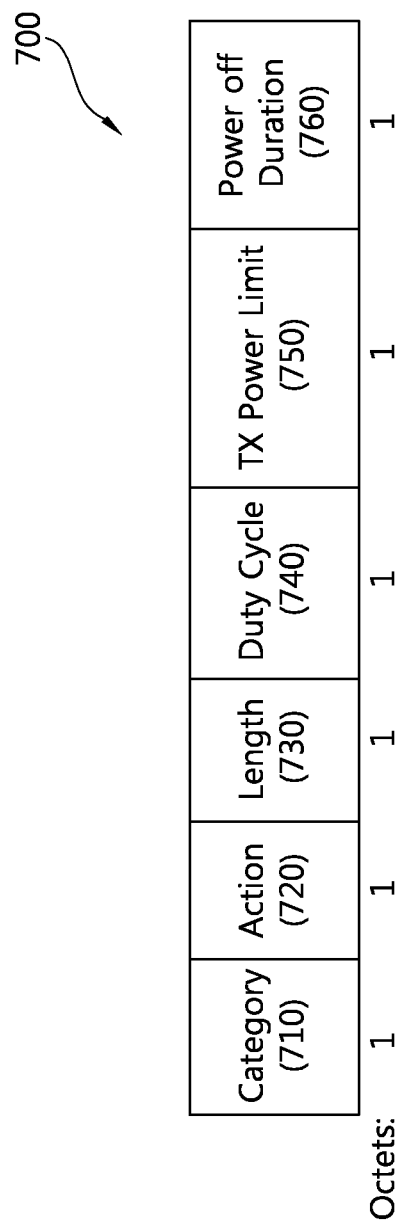
FIG. 7 illustrates a format of a battery lifetime extension management frame according to an embodiment of the present invention.

FIG. 7 illustrates a format of a battery lifetime extension management frame according to an embodiment of the present invention.

Referring to FIG. 7, the battery lifetime extension management frame 700 includes a category field 710, an action field 720, a length field 730, a duty cycle field 740, a Tx power limit field 750, and a power-off duration field 760.

The category field 710 and the action field 720 may be configured to indicate that the frame is a battery lifetime extension management frame 700.

The length field 730 may be configured to indicate the length of the battery lifetime extension management frame 700.

The duty cycle field 740 may be configured to indicate a duty cycle that the AP 310 requires the STA 320 to send.

The transmission power limit field 750 may be configured to indicate a limit value of transmission power for which the AP 310 sets.

When it reaches a limit to extend battery lifetime through duty cycle and transmission power limit, the AP 310 may request that the STA 320 switch to the power-off state before operation. For this purpose, the power-off duration field 760 may be configured to indicate duration during which the STA 320 maintains the power-off state. The power-off duration field 760 may be set as a value indicating duration when the AP 310 requests that the STA 320 switch to the power-off state and then operate and may be set as a predetermined value, e.g., "0", when the STA 320 need not be switched to the power-off state.

Referring back to FIG. 3, when receiving a battery lifetime extension message, the STA 320 operates based on operating information parameters such as duty cycle and transmission power limit which are indicated by the AP 310 (S350). The STA 320 performs an operation for transmitting and receiving radio signals according to the indicated duty cycle and limits power to be used for transmission of radio signals according to the transmission power limit. When the AP 310 requests that the STA 320 operate in the power-off state during a specific time period, the STA 320 may switch to the power-off state and operate during the specific time period.

In the method as illustrated in FIG. 3, the STA may transmit the battery lifetime report message to the AP according to battery lifetime limit value and battery lifetime report interval included in the battery lifetime request message until the STA receives a new battery lifetime request message (S360).

Additionally, as a method of extending the battery life of the STA, the AP may adjust the amount of downlink traffic oriented toward the STA and the interval for traffic treatment.

The AP may discard frames that have low priority or are unnecessary, and may delay the delivery time of the frames by a predetermined time. The reason for delaying the delivery time is to buffer more frames during the time and aggregate the buffered frames so that the aggregated frames are transmitted.

Figure 8:
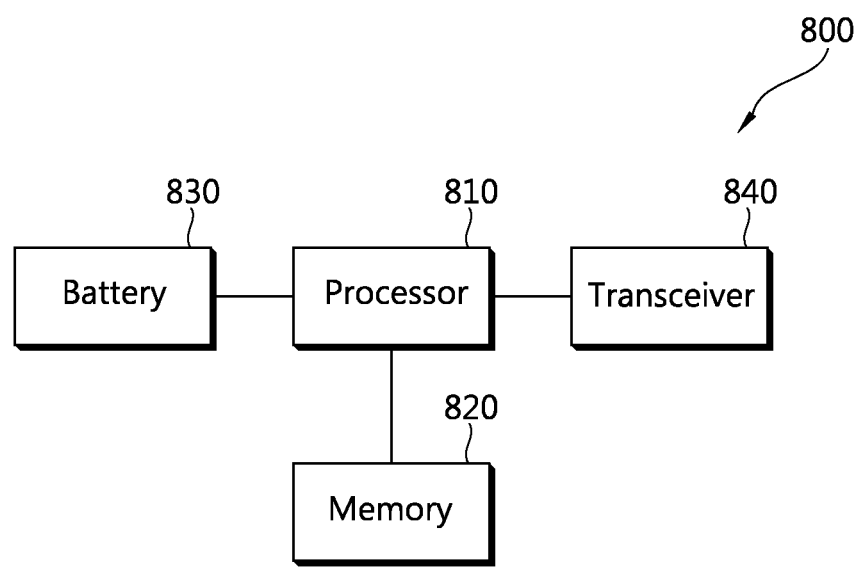
FIG. 8 is a block diagram illustrating a wireless apparatus according to an embodiment of the present invention.

FIG. 8 is a block diagram illustrating a wireless apparatus according to an embodiment of the present invention. The wireless apparatus may include an AP or an STA.

Referring to FIG. 8, the radio device 800 includes a processor 810, a memory 820, a battery 830, and a transceiver 840. The transceiver 840 transmits and/or receives radio signals. The transceiver 840 implements a physical layer based on IEEE 802.11. The battery 830 is an independent power supplying source for operating the wireless apparatus 800. The processor 810 is operatively coupled with the transceiver 830 and implements an MAC and physical layer based on IEEE 802.11. The processor 810 may be configured to implement the embodiments described in connection with FIGS. 2 to 7. The processor 810 may sense consumption/lifetime of the battery, control the operation of the wireless apparatus according to the sensed result, generate a battery lifetime report message according to the battery lifetime, and send the message to another radio device.

The processor 810 and/or the transceiver 840 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 820 and may be performed by the processor 810. The memory 820 may be located inside or outside the processor 810, and may be coupled to the processor 810 by using various well-known means.

The AP provides the STA with conditions for time to report battery lifetime and conditions for the battery threshold. The AP receives the battery lifetime report message from the STA and provides information parameters associated with the operation of the STA to the STA. The STA may operate based on the operating information parameters to extend battery lifetime. The AP selectively provides conditions for battery lifetime report, thereby allowing for efficient power management depending on situations. Such power management method may apply more efficiently to an M2M-supportive WLAN system including battery-based STAs.

What is claimed is:

1. A method of communication based on battery in a wireless LAN system, the method comprising:
    receiving, by a station (STA), a battery lifetime request message from an access point (AP),
    wherein the battery lifetime request message includes a battery lifetime report interval field and battery lifetime report threshold field, the battery lifetime report interval field indicating an interval at which the STA report a battery lifetime, the battery lifetime report threshold field indicating a threshold of the battery lifetime;
    transmitting, by the STA, a first battery lifetime report message including information indicating a first battery lifetime;
    receiving, by the STA, a battery lifetime extension management message from the AP, wherein the battery lifetime extension management message includes a duty cycle field indicating a duty cycle and a transmission power limit field indicating a transmission power limit value; and
    transmitting, by the STA, an extended capabilities information element to the AP, wherein the extended capabilities information element includes a battery lifetime report field indicating whether the STA supports the battery lifetime report and a battery-based operating device field indicating whether the STA is operated based on a battery.

2. The method of claim 1, wherein the first battery lifetime report message is transmitted when a frame transmission interval passes after the battery lifetime request message has been received, if the battery lifetime request message indicates immediate battery lifetime report.

3. The method of claim 2, wherein the first battery lifetime report message is transmitted when the interval indicated by the battery lifetime report interval field passes after the battery lifetime request message has been received, if the battery lifetime request message does not indicate the immediate battery lifetime report.

4. The method of claim 1, further comprising: operating, by the STA, based on the duty cycle and the transmission power limit value.

5. The method of claim 1, wherein the battery lifetime extension management message further includes a power off duration field indicating duration during which the STA operates in a power-off state, the method further comprising: switching, by the STA, to the power-off state; and operating, by the STA, in the power-off state during the duration indicated by the power off duration field.

6. The method of claim 1, further comprising: transmitting, by the STA, a second battery lifetime report message to the AP when the interval indicated by the batter lifetime report interval field passes after the first battery lifetime report message has been transmitted, wherein the second battery lifetime report message includes information indicating a second battery lifetime.

7. The method of claim 6, wherein the information indicating the second battery lifetime is configured to indicate that the switch to a main power-based operation mode has been made, if the STA switches from a battery-based operation mode to the main power based operation mode.

8. The method of claim 1, further comprising: transmitting, by the STA, a switch message to the AP, the switch message indicating that the switch to a main power-based operation mode has been made, if the STA switches from a battery-based operation mode to the main power-based operation mode.

9. The method of claim 1, wherein the extended capabilities information element is transmitted in an association request message that requests that the STA be associated with the AP.

10. The method of claim 1, wherein the extended capabilities information element is transmitted in a probe request frame, the probe request frame being transmitted for scanning an AP with which the STA exchange frames.

11. A wireless apparatus comprising:
    a battery configured to supply power;
    a transceiver configured to transmit and receive radio signals; and
    a processor operatively coupled with the transceiver,
    wherein the processor is configured to:
        receive a battery lifetime request message from an access point (AP), wherein the battery lifetime request message includes a battery lifetime report interval field and battery lifetime report threshold field, the battery lifetime report interval field indicating an interval at which the STA report a battery lifetime, the battery lifetime report threshold field indicating a threshold of the battery lifetime,
        transmit a first battery lifetime report message including information indicating a first battery lifetime,
        receive a battery lifetime extension management message from the AP, wherein the battery lifetime extension management message includes a duty cycle field indicating a duty cycle and a transmission power limit field indicating a transmission power limit value, and transmit an extended capabilities information element to the AP, wherein the extended capabilities information element includes a battery lifetime report field indicating whether the STA supports the battery lifetime report and a battery-based operating device field indicating whether the STA is operated based on a battery.

12. The method of claim 1, wherein the STA transmits the extended capabilities information element including the battery lifetime report when the battery lifetime is equal to or less than a value indicated by the battery lifetime report threshold field.

* * * * *